United States Patent [19]

Bradley

[11] 4,421,186
[45] Dec. 20, 1983

[54] FORK LIFT SCALE

[75] Inventor: Richard S. Bradley, Fairmont, Minn.

[73] Assignee: Weigh-Tronix, Inc., Fairmont, Minn.

[21] Appl. No.: 453,996

[22] Filed: Dec. 28, 1982

Related U.S. Application Data

[63] Continuation of Ser. No. 180,802, Aug. 25, 1980, abandoned.

[51] Int. Cl.³ .............................................. G01G 19/12
[52] U.S. Cl. ................................. 177/139; 73/862.66; 177/211; 177/229; 414/21
[58] Field of Search ............... 177/139, 136, 147, 152, 177/211, 229; 73/862.66; 414/21

[56] References Cited

U.S. PATENT DOCUMENTS

| | | | |
|---|---|---|---|
| 2,822,095 | 2/1958 | Buckingham | 177/136 X |
| 2,935,213 | 5/1960 | Cellitti | 177/139 X |
| 2,940,746 | 6/1960 | Anderson | 177/136 X |
| 3,059,710 | 10/1962 | Pien | 177/136 |
| 3,196,966 | 7/1965 | Kennedy | 177/139 |
| 3,554,025 | 1/1971 | Andersson | 177/211 X |
| 3,695,096 | 10/1972 | Kutsay | 73/862.66 X |
| 3,910,363 | 10/1975 | Airesman | 177/139 |
| 3,949,603 | 4/1976 | Laimins | 177/211 X |
| 3,960,228 | 6/1976 | Nordstrom | 177/211 |
| 4,323,132 | 4/1982 | Bradley | 177/139 |

*Primary Examiner*—Joseph W. Hartary
*Attorney, Agent, or Firm*—Williamson, Bains, Moore & Hansen

[57] ABSTRACT

The weight of items carried by a fork lift truck may be measured by this fork lift scale. This fork lift scale consists of horizontally disposed load sensors connecting a crossbar frame to the crossbars of the fork lift truck. Forks are supported by the crossbar frame. Strain gages are mounted on the load sensors to sense the weight of items carried on the forks. The strain gages are mounted to sense vertical shear or bending in the load sensors. The strain gages are positioned on the load sensors and are electrically interconnected so that types of loading, other than vertical loading due to the weight of items placed on the forks, are rejected and not measured by this fork lift scale.

9 Claims, 8 Drawing Figures

FORK LIFT SCALE

This is a continuation of application Ser. No. 180,802, filed Aug. 25, 1980, now abandoned.

BACKGROUND OF THE INVENTION

This invention relates generally to electrical weighing systems and pertains particularly to strain gage weighing devices for fork lift trucks.

One type of prior art fork lift weighing scale utilizes the deflection of the horizontal position of fork tines as a measure of the weight of items placed on the fork. Such an apparatus is shown by Pien in the U.S. Pat. No. 3,059,710. Pien discloses a double cantilever type of reversing plural member tine having electrical resistance strain gages attached. A problem with this type of structure is that thickness of the fork tines must be large in order to incorporate the strain gages and in order to accommodate the double cantilever type of reversing plural member. Load cells attached to a bar mounted on the tines of a fork lift truck are disclosed by Cellitti et al in U.S. Pat No. 2,935,213.

Another prior art fork lift weighing system incorporates an auxiliary crossbar attached to the fork lift crossbars through a system of flexures. Movement of the auxiliary crossbar with respect to the fork is sensed by vertically disposed load cells. The flexures form a parallelogram type of structure and cause the load cells to be subjected only to vertical loads. Providing an auxiliary crossbar, load cells, and flexures is economically expensive and may obstruct the vision of a person operating a fork lift truck. Additionally, mounting an auxiliary crossbar and flexures on existing fork lift trucks requires that the forks be spaced horizontally away from the fork lift truck to allow the auxiliary crossbar, flexures and load cells to be mounted between the fork lift truck and the forks. Spacing the forks away from the fork lift truck may substantially decrease the load carrying capacity of the fork lift truck and produce an unsafe condition since such a weighing system reduces the weight of load which will tip the fork lift truck. By placing the forks further from the fork lift truck, the overturning moment is achieved with less weight on the forks since the lever arm is increased. The overturning moment can be defined as the moment required to tip the fork lift truck. A mechanical scale mechanism is shown by Anderson et al in U.S. Pat. No. 2,940,746. Anderson et al discloses a scale mechanism which may be incorporated as a part of the fork or platform carriage of a lift truck. Anderson et al describes a cantilever type weighing platform suspended from a weight indicating mechanism which, in turn, is suspended from structures attached to a fork lift truck.

SUMMARY OF THE INVENTION

Accordingly, it is an object of this invention to provide a fork lift scale for measuring the weight of items carried by a fork lift truck.

Another object of this invention is to provide a fork lift scale for measuring the weight of items carried by a fork lift truck, wherein the weight measurement is independent of the location of the items on the forks of the fork lift truck.

An additional object of this invention is to provide a fork lift scale which does not obstruct the vision of the operator of the fork lift truck.

Another object of this invention is to provide a fork lift scale which is mechanically sturdy and weather resistant.

An additional object of this invention is to provide a fork lift scale which may be easily installed on existing, commercially available fork lift trucks.

A further object of this invention is to provide a fork lift scale which may be easily mounted to and demounted from a fork lift truck.

Another object of this invention is to provide a fork lift scale which does not substantially reduce the load carrying capacity of the fork lift truck.

A further object of this invention is to provide a fork lift scale which is economically inexpensive and is cost effective.

Briefly, this invention is a new type of fork lift scale designed to be mounted on a fork lift truck crossbars and to support a pair of load carrying forks. The fork lift scale uses electrical resistance strain gages mounted on deformable members to form load sensors. The load sensors act as mounting bolts used to attach a crossbar frame to the fork lift truck's crossbars and also sense the weight of items placed on the forks. The deformable member of each load sensor is mounted in a horizontal fashion so as to be placed in bending and shear when items having weight are placed on the forks. Electrical resistance strain gages are placed on each deformable member to sense the bending or shear deformation of each deformable member. In the preferred embodiment, two strain gages are mounted on each deformable member and the strain gages are positioned so as to be maximally sensitive to shear strain. The strain gages are positioned symmetrically about a horizontal neutral plane to allow electronic rejection of all types of loading except purely vertical loads. That is, the strain gages are arranged so that the fork lift scale is only sensitive to the weight of items placed on the fork and is not sensitive to how the items are positioned on the fork. Electronic circuitry is provided to obtain the output of each load sensor, add together the load sensor outputs, and present a display indicative of the weight of the items placed on the forks.

These and other objects and advantages of my invention will appear more fully from the following description made in conjunction with the accompanying drawings wherein like reference characters refer to the same or similar parts throughout the several views.

DESCRIPTION OF THE PREFERRED EMBODIMENT OF THE INVENTION

Figure 1:
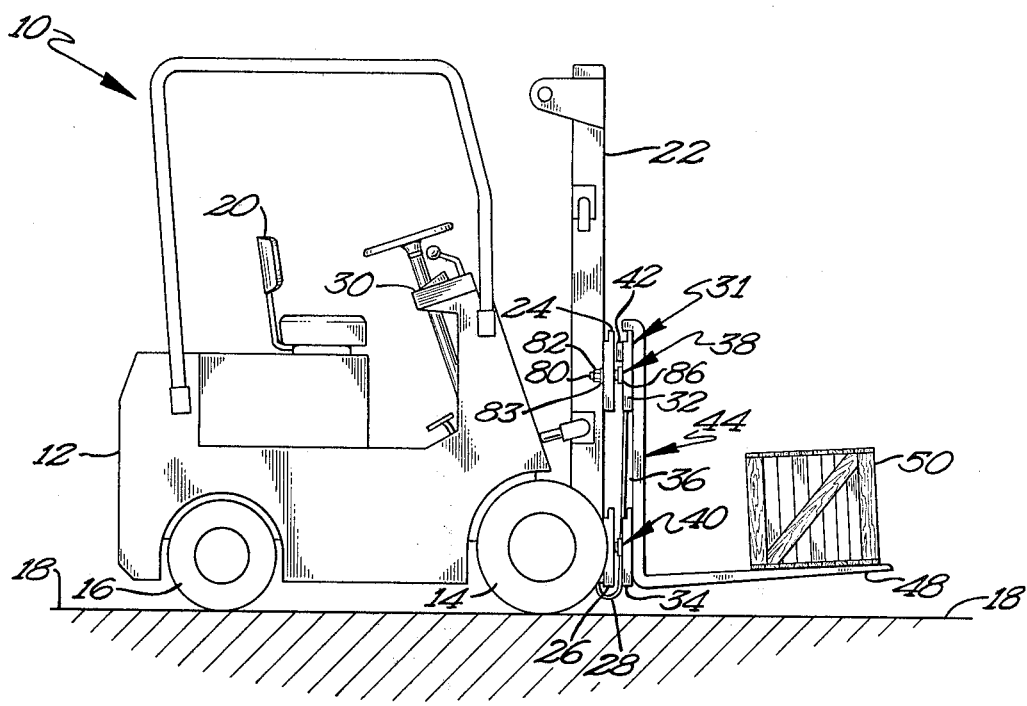
FIG. 1 is a side elevational view of a fork lift truck with the fork lift scale and forks attached.

Referring first to FIG. 1, the fork lift truck is denoted generally by the number 10. The fork lift truck 10 is of the usual, commercially available type which may be used to raise, lower, and convey various items. The fork lift truck 10 has a chassis 12 mounted on front wheels 14 and rear wheels 16. Wheels 14 and 16 contact the ground 18. A person operating the fork lift truck 10 may sit in the operator's seat 20 which is mounted on the chassis 12. Loads are lifted by the fork lift truck 10 by moving upper crossbar 24 and lower crossbar 26 upwardly.

Load box 50 is typical of the items which may be carried by fork lift truck 10. The weight of box 50 due to the earth's gravitational field is measured by this invention and is visually presented by display 30 which may be of any type and may include a needle mounted on a dial or a group of numeric digits. Display 30 is electrically connected with junction box 42 by means of display cable 28. Electrical power for the electronic circuitry used in this invention may be obtained from batteries mounted inside display 30 or may be obtained from the fork lift truck 10. Display 30 preferably includes a rugged, mechanically sturdy and weather resistant enclosure for housing the electronic circuitry used in this invention.

Existing, commercially available fork lift trucks similar to that shown herein as number 10 are normally equipped with crossbars similar to crossbars 24 and 26 shown herein. This invention includes a crossbar frame 31 positioned in front of crossbars 24 and 26 so that the vision of an operator of fork lift truck 10 seated in seat 20 is not obstructed by frame 31. Similarly, the other elements of this invention are positioned so as to not obstruct the vision of the operator of fork lift truck 10, as further shown herein. For safety reasons, it is important that an operator of fork lift truck 10 be able to see in a forward direction and be able to monitor the position of items, such as box 50, carried by the truck 10.

Figure 2:
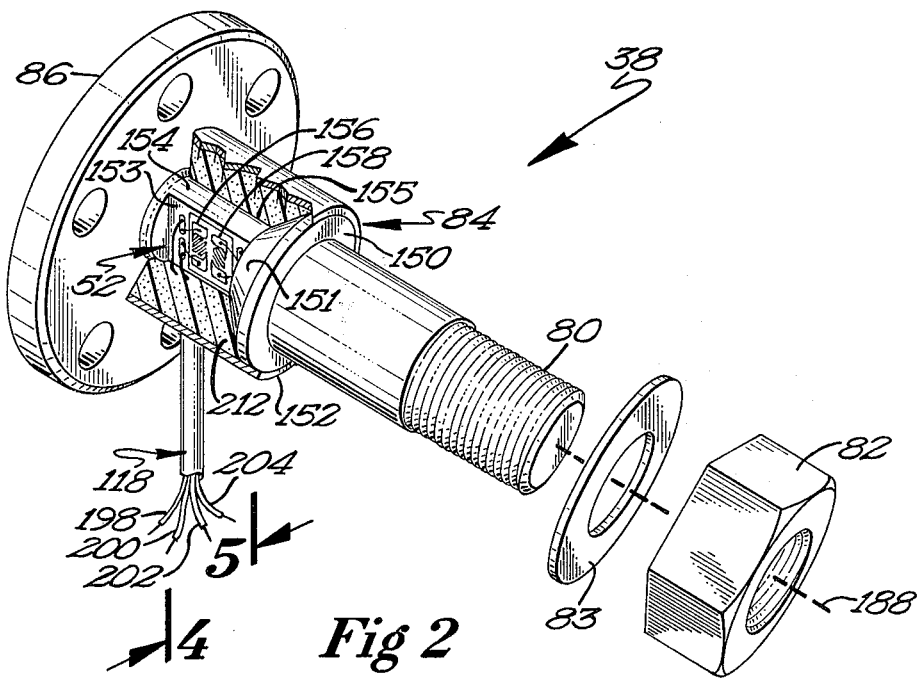
FIG. 2 is a partly cut-away perspective view of a load sensor cell.

Referring next to FIG. 2, load sensor 38 comprises a threaded shank 80, sensor section 84 and flange 86. Sensor section 84 consists of a deformable member 154 and a ring 150 surrounded by a cylindrical shroud 152. Flange 86, deformable member 154, ring 150 and threaded shank 80 are preferably unitary in construction and preferably comprise a single machined metallic piece, formed to the shape shown.

Flange 86 is a solid, flat, circular disk adapted to be welded or bolted to crossbar frame 31 (See FIG. 1). Deformable member 154 is an elongated, solid bar extending along the axis 188 of flange 86 and is preferably shaped as a solid circular cylinder having notches cut therein to form surfaces 153 and 155. Surfaces 153 and 155 are parallel, vertically disposed surfaces, symmetric about axis 188 and extend for substantially the entire length of deformable member 154. Thus, for substantially all of the length of deformable member 154, the outline of the cross section of deformable member 154 is approximately rectangular, having two straight sides associated with surfaces 153 and 155 and having two rounded sides.

Surfaces 153 and 155 are separated by a distance large enough so that load sensor 38 is not permanently deformed or damaged when load sensor 38 is in place on fork lift truck 10 and fork lift truck 10 is used to lift or carry loads. Surfaces 153 and 155 are separated by a distance small enough so that strain gages 52 and 54 (See FIG. 5) may be conveniently mounted on surfaces 153 and 155, respectively. Thus, deformable member 154 is shaped like and behaves mechanically like a rectangular beam extending between flange 86 and ring 150.

Shank 80 comprises an elongated cylinder coaxial with flange 86 and extending along axis 188. Shank 80 slips through washer 83 and is equipped with threads to mate with the threads of nut 82. Nut 82 is a hexagonal machine nut of the usual kind.

Ring 150 has a right frusto-conical shape and is positioned between deformable member 154 and shank 80. Ring 180 has a tapered section 151 which tapers inward towards deformable member 151. The function of ring 150 is to support and serve as an attachment point for cylindrical shroud 152. Another function of ring 150 is to serve as a stop along the length of shank 80 and to bear against upper crossbar 24 (see FIG. 1).

Figure 3:
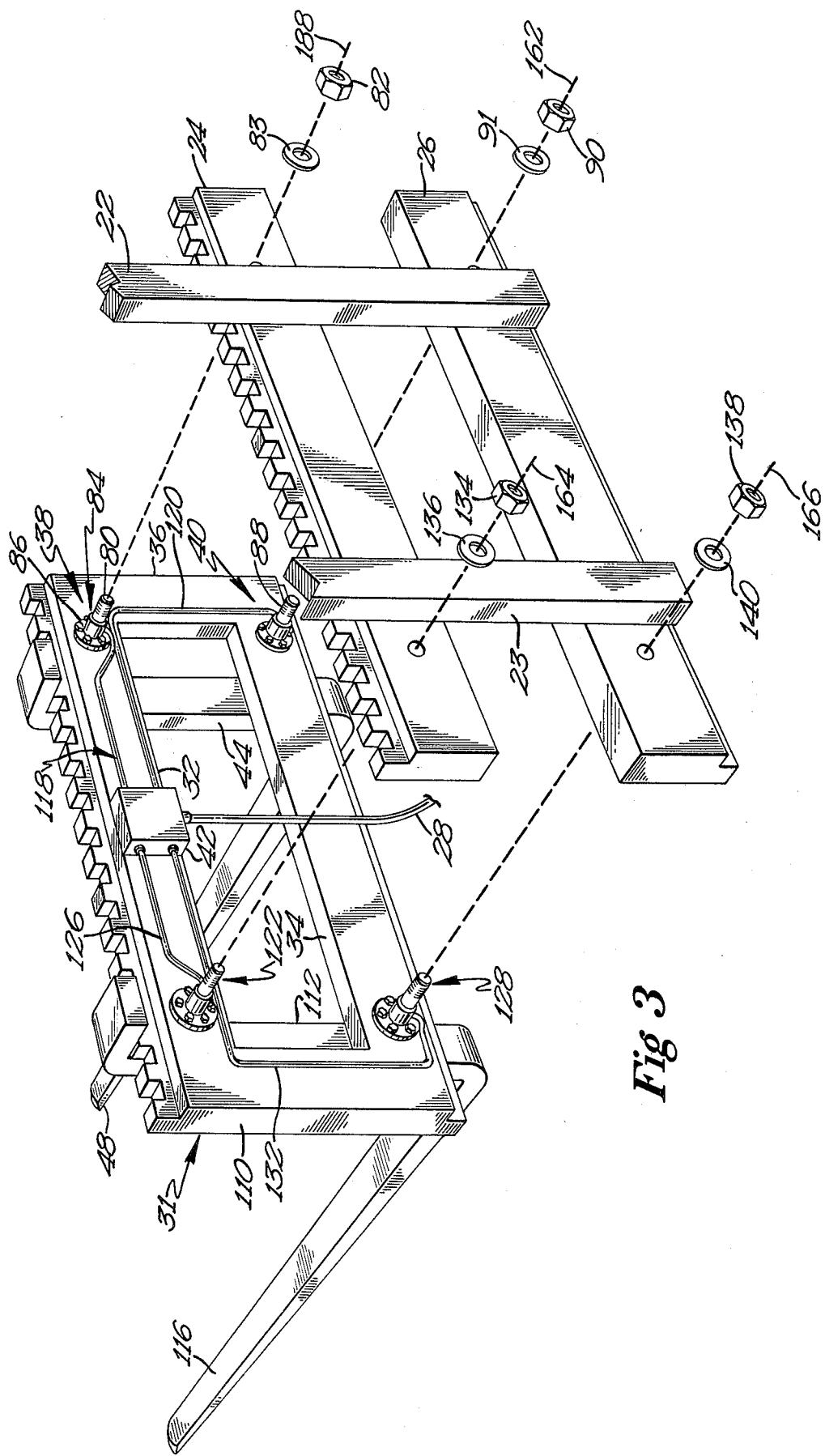
FIG. 3 is a rear perspective view of the fork lift scale and forks also having a portion of the fork lift truck.

Referring next to FIG. 3, load sensors 38, 40, 122 and 128 are bolted to crossbar frame 31. Load sensors 40, 122 and 128 are substantially identical in construction to load sensor 38 and have axes 162, 164 and 166 corresponding to axis 188. Threaded shank 80 passes through upper crossbar 24, and load sensor 38 is held in place on crossbar 24 by means of washer 83 and nut 82 which are mounted on shank 80. Similarly, threaded shank 88 of load sensor 40 passes through lower crossbar 26 and has washer 91 and nut 90 mounted thereon to hold load sensor 38 in place on lower crossbar 26. In a like manner, load sensors 122 and 128 are held in place on crossbars 24 and 26, respectively, by washers 136 and 140 and by nuts 134 and 138.

The nuts 82, 90, 134 and 138 are threadably mounted on load sensors 38, 40, 122 and 128 to allow crossbar frame 31 to be easily mounted to and demounted from crossbars 24 and 26 of fork lift truck 10 (see FIG. 1). The combination of crossbar frame 31 and load sensors 38, 40, 122 and 128 form a mechanically sturdy and weather resistant combination which may be easily installed on existing, commercially available fork lift trucks.

Load sensors 38, 40, 122 and 128 are connected to junction box 42 by multi-conductor electrical cables 118, 120, 126 and 132, respectively. The function of cables 118, 120, 126 and 132 is to convey electrical signals to and from the respective load sensors 38, 40, 122 and 128. The function of load sensors 38, 40, 122 and 128 is to mechanically connect crossbar frame 31 to the crossbars 24 and 26 and also to transduce or sense the weight of items carried by forks 44 and 112 which are suspended from crossbar frame 31.

Crossbar frame 31 is preferably a welded rectangular metal frame comprising an upper frame member 32, a lower frame member 34, a right separator 36, and a left separator 110. Members 32 and 34 and separators 36 and 110 define a square, empty, open area through which the operator of fork lift truck 10 (see FIG. 1) may look so that the vision of said operator is not unduly obstructed.

Right fork 44 and left fork 112 are suspended from crossbar frame 31 and preferably comprise L-shaped metal bars of the usual, commercially available kind. Forks 44 and 112 have generally horizontally disposed lifting surfaces 48 and 116, respectively, onto which items may be placed in order to be carried by fork lift truck 10 (see FIG. 1). Forces caused by the weight of items placed on surfaces 48 and 116 are transferred through forks 44 and 112, through frame 31, through sensors 38, 40, 122 and 128, to crossbars 24 and 26 and fork lift truck 10.

The weight of items placed on surfaces 48 and 116 causes forces to be applied to sensors 38, 40, 122 and 128. Sensors 38, 40, 122 and 128 are each exposed to generally vertically oriented shearing forces due to the weight of items placed on surfaces 48 and 116; wherein said shearing forces are generally perpendicular to axes 188, 162, 164 and 166, respectively. Sensors 38 and 122 are exposed to generally horizontally oriented tension forces due to the weight of items placed on surfaces 48 and 116; wherein said tension forces are generally parallel to axes 188 and 164, respectively. Sensors 40 and 128 are exposed to generally horizontally oriented compression forces due to the weight of items placed on surfaces 48 and 116; wherein said compression forces are generally parallel to axes 162 and 166, respectively.

When the weight of items carried by forks 44 and 112 is evenly distributed between surfaces 48 and 116, the forces applied to sensor 38 are approximately equal to the forces applied to sensor 122 and the forces applied to sensor 40 are approximately equal to the forces applied to sensor 128. When the weight of items carried by forks 44 and 112 is unevenly distributed between surfaces 48 and 116 as by placing more weight on surface 48, the applied forces may differ between sensors 40 and 128, and generally horizontally oriented shear forces may be applied to sensors 38, 40, 122 and 128 in planes generally perpendicular to axes 188, 162, 164 and 166, respectively.

Existing, commercially available fork lift trucks similar to that shown herein as number 10 are normally equipped with forks 44 and 112 suspended from crossbars 24 and 26.

Figure 4:
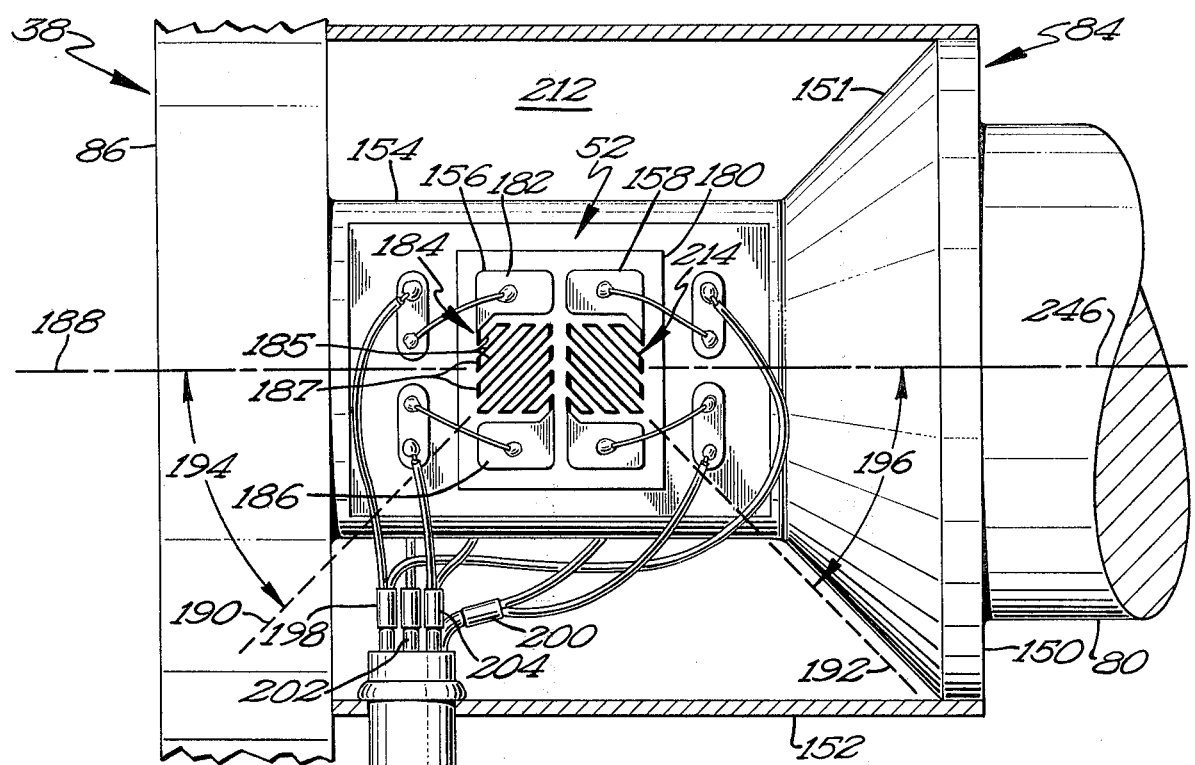
FIG. 4 is a partly cut-away side elevational view of the load sensor of FIG. 2 taken in the direction of arrows 4—4.

Referring now to FIG. 4, a magnified view of a portion of shear cell 38 shown in FIG. 4 is presented. Strain gages 156 and 158 are attached to mounting pad 180. Mounting pad 180 is preferably a thin sheet of nonmetallic electrically insulating material attached to deformable member 154. Mounting pad 180 with strain gages 156 and 158 attached may be purchased as a commercially available item. In practice, one of the steps in manufacturing my shear cell 38 is gluing pad 180 to deformable member 154.

Strain gage 156 is typical of the overall structure of electrical resistance strain gages used in my invention and consists of a strain sensitive conductor 184 placed between electrical contact 182 and electrical contact 186. Strain gage 156 may comprise a thin metallic foil which has been etched to obtain the shape shown. Contacts 182 and 186 are electrically conductive pads to which wires may be soldered. Strain sensitive conductor 184 is preferably a metallic foil formed into non-overlapping elongated loops. The loops of strain sensitive conductor 184 comprise a plurality of elongated portions 185 interconnected by short, wide conductors 187. The elongated portions 185 of the strain sensitive conductor 184 are parallel to the dotted line 190. Note that strain sensitive conductor 184 could alternatively be formed by non-overlapping loops of conductive wire bonded to mounting pad 180. Strain gage 158 is similarly constructed with a strain sensitive conductor 214 having elongated loop portions parallel to dotted line 192.

In practice, strain sensitive conductor 184 is constrained to deform in the same way as that portion of the surface deformable member 154 over which strain sensitive conductor 184 is attached. That is, strain sensitive conductor 184 deforms as if it were a part of the deformable member 154.

Dotted line 188 is a projection from the neutral axis of deformable member 154. In this preferred embodiment, the neutral axis of deformable member 154 is colinear with the geometric axis of deformable member 154 and deformable member 154 is formed as a solid circular cylinder. Line 190 intersects with line 188 at an angle 194 of approximately 45°. Line 192 intersects with line 188 at an angle 196 of approximately 45°. Note that the line 188 is generally horizontal when shear cell 38 is mounted between frame 31 and cross bar 24, as shown in FIG. 1. The size of angles 194 and 196 is chosen to maximize the sensitivity of strain gages 156 and 158 when deformable member 154 is in vertical shear. Strain gage 156 functions by changing the electrical resistance in strain sensitive conductor 184 between contact 182 and 186. The electrical resistance of the elongated portions 185 of strain sensitive conductor 184 changes when mechanical strain causes the elongated portions 185 to change in length and cross-section. Resistance changes in strain gages 156 are maximized when mechanical strain occurs in a direction parallel to line 190 which is parallel to the elongated portions 185 of strain sensitive conductor 184. Similarly, the electrical resistance of strain gage 158 is particularly sensitive to mechanical strains occurring parallel to line 192. Mechanical strain due to vertical shear is maximum in deformable member 154 at angles which are approximately 45° from the line 188.

Wires 198, 200, 202, and 204 comprise cable 118 and communicate electrical signals with shear cell 38. Wire 198 is soldered to and makes electrical contact with contact 182 of strain gage 156. Similarly, wire 200 contacts strain gage 158. A hollow cavity 212 is defined in the space between the deformable member 154 and shroud 152. Cavity 212 provides space for the routing of wires used to interconnect the strain gages and may be filled with an epoxy or silicone potting compound to prevent movement of the wires used and to anchor cable 118. The use of such a potting compound inside cavity 212 also protects the strain gages from moisture, mechanical abrasion and other damaging outside influences.

Figure 5:
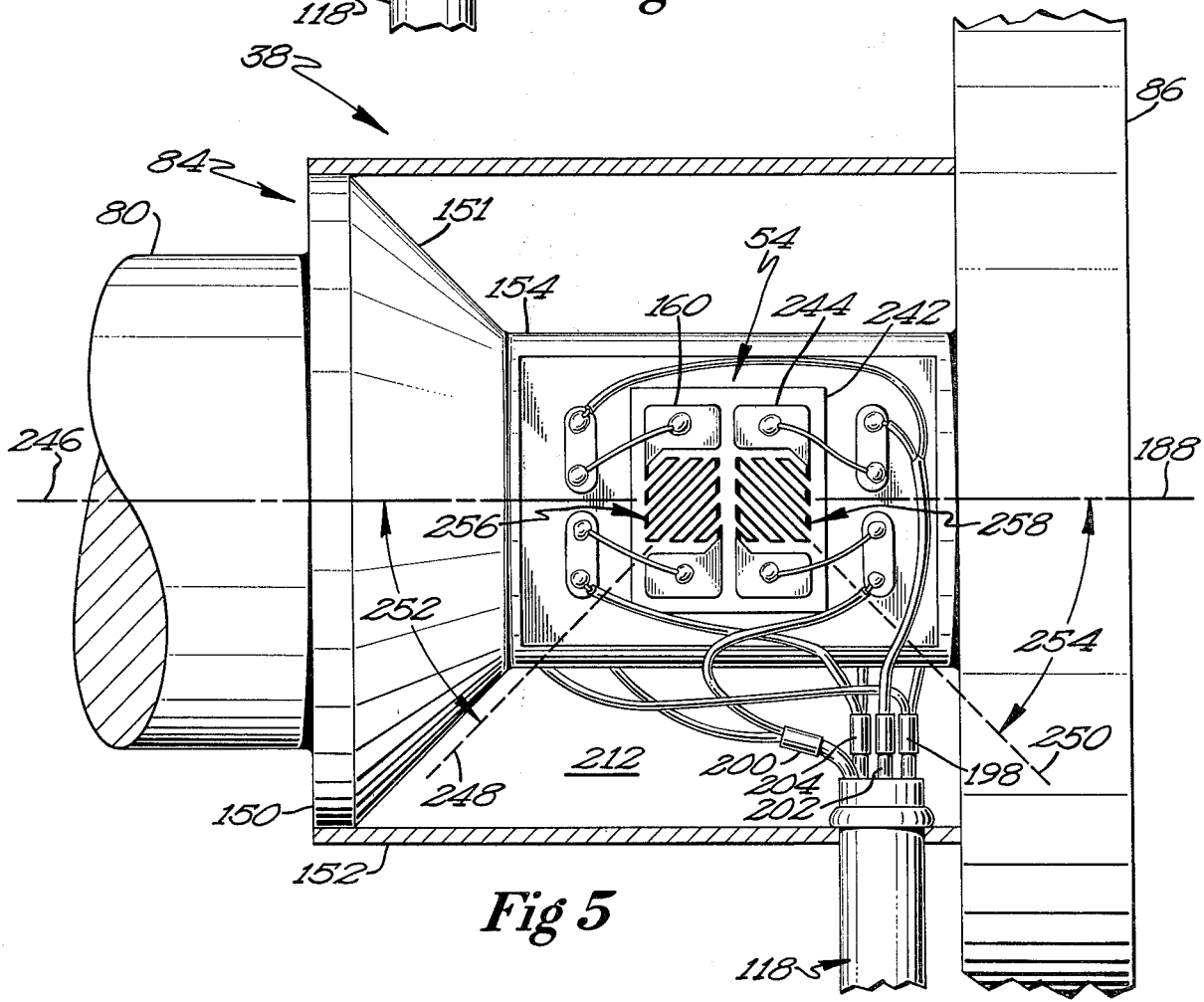
FIG. 5 is a partly cut-away side elevational view of the load sensor of FIG. 2 taken in the direction of the arrows 5—5.

Referring now to FIG. 5, a view of shear cell 38 is shown depicting the side opposite that shown in FIG. 4. Strain gages 160 and 244 are attached to mounting pad 242 which is attached to deformable member 154. Mounting pad 242 is preferably a thin sheet of electrically insulating material similar to pad 180. Dotted line 246 is projected from the neutral axis of deformable member 154. Strain gage 160 has a strain sensitive conductor 256 having elongated portions which are parallel to dotted 248. Line 248 intersects line 246 at an angle 252 of approximately 45°, as shown. Strain gage 244 has a strain sensitive conductor 258 having elongated portions parallel to dotted line 250. Line 250 intersects line 246 at an angle 254 of approximately 45°. The sizes of angles 252 and 254 are chosen to maximize the response of strain gages 160 and 244 to vertical shear strain. Note that angles 252 and 196 open inwardly along line 246 towards threaded shank 80. Note, in contrast, that angles 254 and 194 of FIG. 4 open outwardly along line 188 towards flange 86. It will be seen that strain gages 156 and 158 perform the same function with respect to strain gages 160 and 244 in terms of measuring vertical shear.

Wires 202, 204, 208, 210, and 240 are used to communicate electrical signals to strains gages 160 and 244. Taken together, strain gages 156, 158, 160, and 244 together with wires 206, 208, 210, and 240 comprise a Wheatstone bridge configuration. Wires 198, 200, 202 and 204 make contact with the nodes of the Wheatstone bridge configuration.

Figure 6:
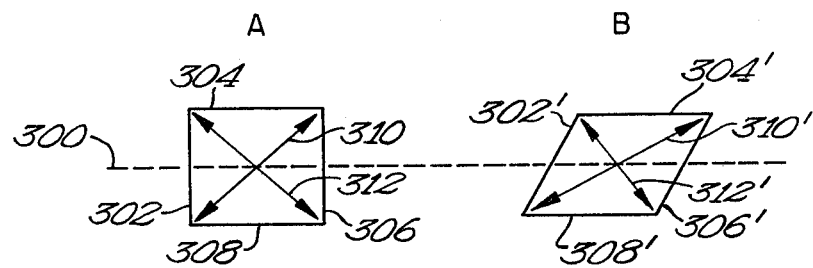
FIG. 6 is a stress and strain analysis diagram depicting the deformation of a load sensor.

Referring now to FIG. 6, it will be seen that stress analysis diagram of a transducer is thereshown. One side of a transducer is represented as a rectangle in A of FIG. 6 in an unstressed condition with respect to vertical loading. The rectangle includes sides 302, 304, 306, and 308, along with diagonals 310 and 312. The dotted line 300 represents the neutral axis. In B of FIG. 6, one side of the transducer is represented in a stressed condition with respect to vertical loading and includes sides 302', 304', 306', 308', and diagonals 310' and 312'. The diagonals represent maximum compressive and tension loading in the transducer due to shear and of course, it will be appreciated that the direction of loading is approximately 45° relative to the neutral axis. It will also be appreciated that all of the strain gages are subjected to the same strain when a compression or tension load is applied to a transducer. Therefore, the Wheatstone legs do not unbalance and this produces a result of no unbalance between the respective outputs of the bridge from end loading.

Figure 7:
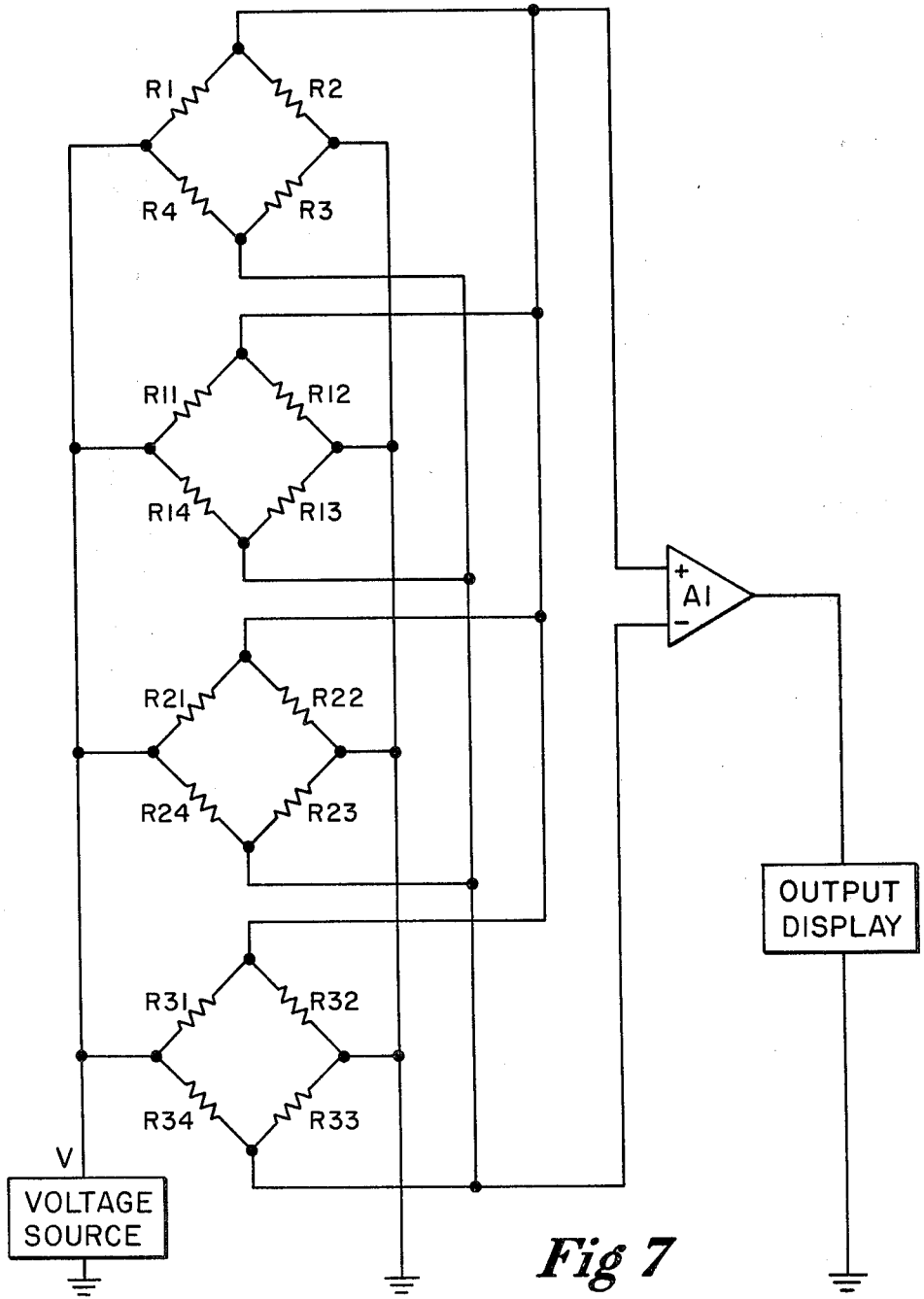
FIG. 7 is an electrical schematic diagram of the circuitry used in this invention.

FIG. 7 shows an overall schematic diagram for the circuitry used in my invention in which electrical resistance strain gages have been represented symbolically as their equivalent resistors. Strain gages 156, 158, 244, and 160 have been symbolized by resistances R1, R2, R3, and R4, respectively. R1, R2, R3, and R4 form a Wheatstone bridge which is excited by a voltage source which supplies a voltage V. The voltage source may supply direct or alternating current. A bridge output voltage E1 is generated according to the equation:

$$E1 = V\left(\frac{R2}{(R1 + R2)} - \frac{R3}{(R3 + R4)}\right) \quad \text{Equation 1}$$

For the best results, resistances R1, R2, R3, and R4 are constructed so as to have nearly the same electrical resistance when no weight is present on fork 52. Also, the strain gages corresponding to R1, R2, R3, and R4 should have nearly identical gage factors, that is, the resistance of each strain gage should change by an identical amount when each strain gage is exposed to the same strain. If each strain gage has an identical temperature coefficient of resistance, no substantial change in E1 will be noticed when the ambient temperature changes. If R1, R2, R3, and R4 are approximately equal and the change in each of those resistances when fork 52 is loaded are small compared to those resistances, then the following proportionality is approximately correct (note that "Δ" means "change in" and K is a proportionality constant):

$$\Delta E_1 = K(\Delta R_1 - \Delta R_2 + \Delta R_3 - \Delta R_4) \quad (2)$$

A Wheatstone bridge comprised of resistors R11, R12, R13, and R14 which generates an output voltage E2 symbolizes shear cell 40. A Wheatstone bridge comprised of resistors R21, R22, R23, and R24 which have a bridge output voltage E3 symbolizes shear cell 122. Resistors R31, R32, R33, and R34 comprise a Wheatstone bridge having an output voltage E4 symbolizing shear cell 128.

Shear cells 38, 40, 122, and 128 have substantially the same mechanical structure and exhibit the same type of electrical behavior when stressed in the same way. Amplifier A1 inverts and amplifies the bridge output signal E1. The signals are summed before reading the amplifier and this signal is supplied to the output display. The output display corresponds to display 30 of FIG. 1 and presents a mathematical summation of the vertical shear forces measured by the shear cells 38, 40, 122, and 128 which is equal to the weight of the items placed on fork 52.

Figure 8:
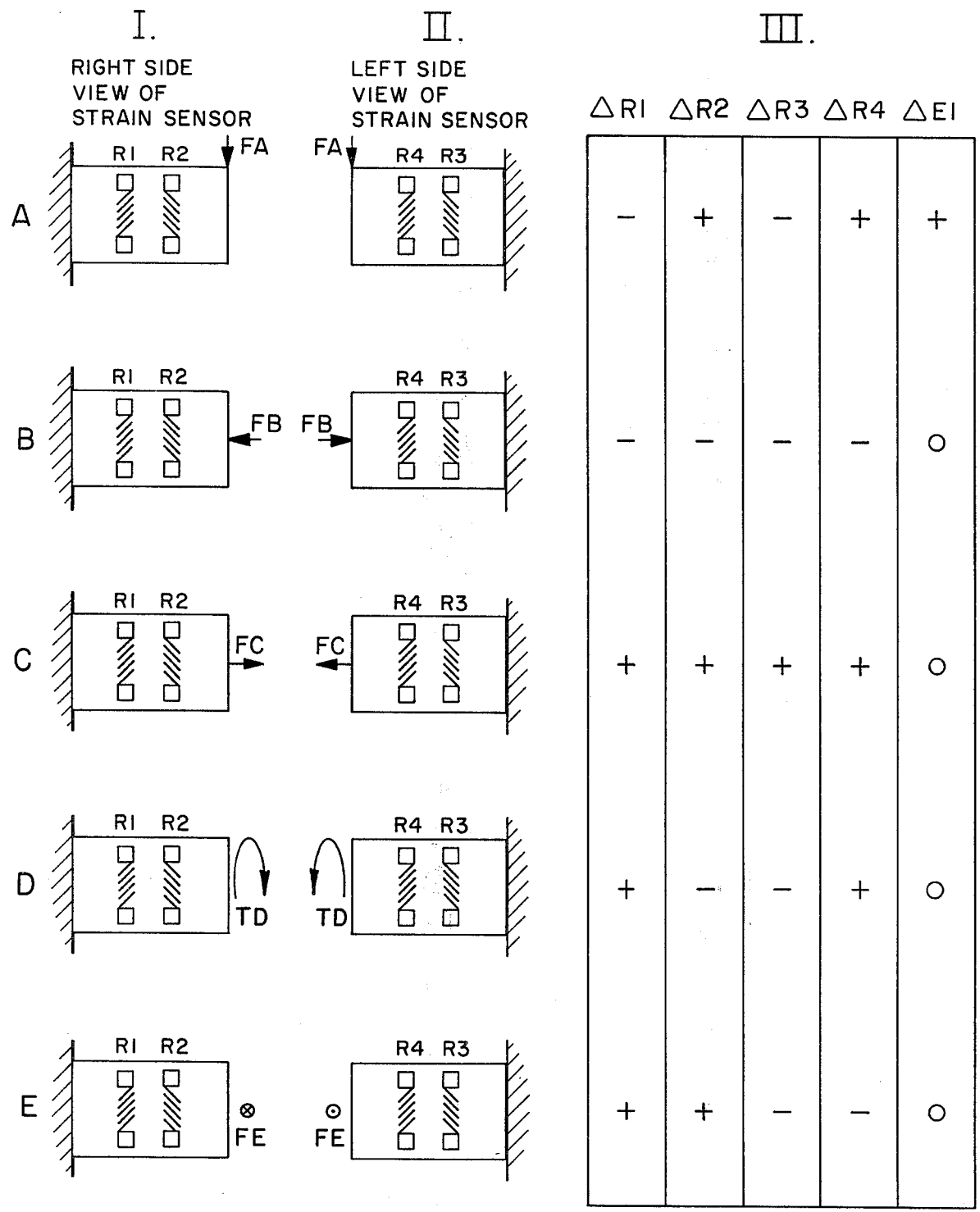
FIG. 8 is a tabulation having rows and columns illustrating the behavior of this fork lift scale invention when subjected to various types of loading.

Referring now to FIG. 8, the response of shear cell 38 to a variety of loading conditions is shown. The effect of placing various types of weights on fork 52 and of placing weights in various positions on fork 52 can be symbolized by equivalent forces and moments experienced by shear cells 38, 40, 122, and 128. For example, placing a weight on the tine surfaces 48 and 116 shown in FIG. 1 will cause vertical forces horizontal forces and bending moments to be applied to shear cells 38, 40, 122, and 128. If the amount of weight resting on tine surface 48 is different than the amount of weight resting on the surface 116, a torque or twisting moment may be applied to shear cells 38, 40, 122, and 128. Placing weights against tine surfaces 46 and 114 may result in horizontal forces being seen by shear cells 38, 40, 122, and 128. The theory that my invention relies on is that the summation of the vertical shearing forces seen by shear cells 38, 40, 122, and 128 is equal to the weight of items placed on the fork 52. Thus, my shear cells 38, 40, 122, and 128 are designed to be insensitive to types of loading other than vertical shear forces.

Rows (a) through (e) of FIG. 8 represent different types of force and moment loading which may be applied to shear cell 38. Because of the similarity among the shear cells, FIG. 8 also represents the behavior of shear cells 40, 122, and 128. Column I contains symbolic diagrams of the side of shear cell 38 that was shown in FIG. 4. Column II contains a symbolic diagrams of the side of shear cell 38 shown in FIG. 5. Column III is a tabulation of change in resistance values and change in voltage values as used in Equation 2. The contents of Column III have been symbolized by "+" meaning an increase in resistance or voltage, "−" meaning a decrease in voltage or resistance, and "o" meaning no change in resistance or voltage.

Row (a) shows that voltage E1 decreases when a vertical force F is applied to shear cell 38. Such a vertical force F corresponds to a force caused by the weight of items placed on fork 52. Shearing forces caused by this force F are sensed by shear cell 38 and produce a change in voltage E1 which results in an indication by weight by the output display. Thus, shear cells 38, 40, 122, and 128 are constructed so as to be sensitive to vertical forces such as force F shown in Row (a) which result from the placing of items having weight on fork 52.

Row (b) shows that no change in E1 occurs when a bending moment M is applied to shear cell 38. Such a moment M corresponds to the bending moment produced by placing items having weight on fork 52. Moment M is expected to increase as such items are moved away from the fork lift truck 10 along the tine lifting surfaces 48 and 116. Since it is desirable not to have display 30 affected in any way by the position of items on fork 52, I have designed my fork lift scale to be insensitive to bending moments. The lower transducers are subjected to compressive force which may be considered a reaction force brought about by placing a weight on the tines away from the carriage. Since E1 is unaffected by moment M in Row (b), the output display does not reflect the position of items placed on fork 52.

Row (c), shows that no change in E1 occurs when a horizontal force F is applied to shear cell 38. Tension force does occur on the upper transducers and may be considered a reaction force by placing weights on the tines away from the carriage. Such a horizontal force F may result when items placed on a fork 52 touch the back tine surfaces 46 and 114. Such a horizontal force F may also result from placing items on tine lifting surfaces 48 and 116 and may be a function of the distance of such items from fork lift truck 10. Row (c) illustrates that the output display is unaffected by force F. Also, a force F shown will not cause a change in the output display.

Row (d) shows that no change in E1 occurs when a torque or twisting moment T is applied to shear cell 38.

Torque T of Row (d) may result when the weight carried by tines 44 and 112 is unequally distributed. The output display is unaffected by such an unequal weight distribution and is sensitive only to the amount of weight carried by fork 52. Note that the torque vector T of Row (d) is equivalent to a counterclockwise twist applied to the threaded shank 80 of FIG. 2. Some degradations in the performance of my invention may occur in practice. For example, the physical construction of gage factors of and resistance temperature coefficients of strain gages used in constructing my fork lift scale may result in performance which is not ideal in that all of the objectives listed herein are not fully met. Such imperfections or non-uniformities in strain gages may result in a fork lift scale which is somewhat sensitive to the distribution or position of items placed on fork 52. However, my invention is constructed so as to minimize the output display sensitivity to the position or distribution of items placed on fork 52.

It is anticipated that various changes may be made in the shape, construction and operation of the invention as disclosed herein without departing from the spirit and scope of the invention as defined in the following claims. In particular, it is anticipated that differing configurations of strain gages may be mounted on shear cells 38, 40, 112, and 128 to achieve some or all of the objects of this invention. It is further particularly anticipated that various changes may be made in the type of electronic circuitry disclosed in FIG. 7 herein.

What is claimed is:

1. A fork lift scale for weighing items placed on a fork of a fork lift truck, said fork lift scale comprising:
   a deformable member for use in attaching a fork to the fork lift truck, said deformable member having a material axis and comprising a single beam being disposed in substantially horizontal relation and extending in a fore and aft direction, said deformable member having opposed substantially vertically disposed planar surfaces intermediate the ends thereof, a plurality of electrical strain gages mounted on said planar surfaces of said deformable member and positioned on the neutral axis of the latter to sense the deformation of said deformable member caused by the weight of an item placed on the fork, the load exerted on the deformable member by the fork of the fork lift truck being spaced longitudinally of said strain gages, and, a Wheatstone bridge circuit including said strain gages operable to produce an output signal caused by deformation of said deformable member, said strain gages being connected in said bridge circuit to electrically sense vertical load only and being insensitive to and rejecting all other loads, and means for converting the output signal into a perceptive weight readout.

2. A fork lift scale for weighing items placed on the fork of a fork lift truck, said fork lift scale comprising:
   a plurality of deformable members for use in attaching a fork to the fork lift truck, each deformable member having a neutral axis and comprising a single elongate beam being disposed in substantially horizontal relation and extending in a fore and aft direction, each of said deformable members having opposed substantially vertically disposed planar surfaces intermediate the ends thereof,
   a plurality of electrical resistant strain gages mounted on said planar surfaces of each of said deformable members, said strain gages for each deformable member being positioned symmetrically on the neutral axis of the latter to sense the deformation of the latter caused by the weight of an item placed on the fork, the load exerted on each deformable member by the fork of the fork lift truck being spaced longitudinally of said strain gages on each deformable member,
   a plurality of electrically connected Wheatstone bridge circuits, each circuit including the strain gages of each deformable member, each bridge circuit producing an output signal caused by deformation of the associated deformable member, said strain gages being connected to the associated bridge circuit to electrically sense vertical load only and rejecting all other loads, and means summing the output signals from each bridge circuit and for converting the summed output signals into perceptive weight readout.

3. The fork lift scale as defined in claim 2 wherein the neutral axis of said deformable members are disposed in parallel relation with respect to each other and extend generally in the direction of travel of the fork lift truck, the load exerted on each deformable member by the fork of the fork lift truck being spaced forwardly of the strain gages on each deformable member.

4. In combination with a fork lift truck having ground engaging propulsion wheels, a lifting guide mounted on the front end of the lift truck, a lifting fork assembly projecting forwardly of the truck for use in lifting items, a scale for use in measuring the weight of items placed on the fork assembly, comprising:
   a plurality of horizontally disposed members for use in connecting the fork assembly to the lifting guide and extending in a fore and aft direction, each deformable member having a neutral axis and having opposed substantially vertical planar surfaces,
   a plurality of electrical resistant strain gages mounted on said planar surfaces of each of said deformable members and being symmetrically disposed on the neutral axis of each deformable member to sense the deformation of the latter caused by the weight of an item placed on the fork assembly, the load exerted on each of said deformable members by the lifting fork assembly of the fork lift truck being spaced longitudinally forwardly of said strain gages on each deformable member, and a plurality of Wheatstone bridge circuits, each circuit including the strain gages of each deformable member, each bridge circuit producing an output signal caused by deformation of the associated deformable members, said strain gages being electrically connected in the associated bridge circuit to electrically sense vertical loads only and to electrically reject all other loads, and means for converting the output signals into a perceptive weight readout.

5. The fork lift truck as defined in claim 4 wherein each of said deformable members has a pair of strain gages mounted on each planar surface thereof, and wherein the load exerted on each deformable member by the lifting fork is spaced longitudinally forwardly of the strain gages for each deformable member.

6. The fork lift truck as defined in claim 4 and wherein each of said deformable members is provided with an annular stop element intermediate the ends thereof, said lifting guide engaging the annular stop element on each deformable member to space the lifting guide rearwardly of said strain gages on each deformable member.

7. The fork lift truck as defined in claim 4 and means on the forward end portion of each deformable member connected with the lifting frame assembly whereby the load exerted on each deformable member by the weight of an object on the lifting fork assembly is spaced longitudinally of the strain gages on each deformable member.

8. A fork lift scale for weighing items placed on the fork of a fork lift truck, said fork lift scale comprising:
a plurality of deformable members for use in attaching a fork to the fork lift truck, each deformable member having a neutral axis and each comprising a single elongate beam,
a plurality of electrical resistant strain gages mounted on each of said deformable members and being disposed on the neutral axis of the associated deformable member to sense the deformation of the latter caused by the weight of an item placed on the fork, the load exerted by the weight of an item positioned on the fork of the fork lift truck being spaced longitudinally of the strain gages of each deformable member,
and a plurality of bridge circuits including said strain gages producing output signals caused by deformation of said deformable members, said strain gages being connected in the associated bridge circuit to electrically sense vertical loads only and reject all other loads, and means for converting said output signal into a perceptive weight readout.

9. The fork lift scale as defined in claim 8 wherein each of said deformable members comprises a single, elongate, horizontally disposed beam having threads thereon to define a bolt for use in connecting the fork with the fork lift truck, each deformable member extending in a fore and aft direction, the load exerted by the weight of an object on the fork of the fork lift truck on each deformable member being spaced longitudinally forwardly of the strain gage on each deformable member.

* * * * *

UNITED STATES PATENT AND TRADEMARK OFFICE
CERTIFICATE OF CORRECTION

PATENT NO. : 4,421,186
DATED : December 20, 1983
INVENTOR(S) : Richard S. Bradley It is certified that error appears in the above-identified patent and that said Letters Patent are hereby corrected as shown below:

Column 2, line 55, delete "having" and substitute --showing--.

Column 9, claim 1, line 56, delete "material" and substitute --neutral--.

Signed and Sealed this

Twenty-eighth Day of February 1984

[SEAL]

Attest:

Attesting Officer

GERALD J. MOSSINGHOFF

Commissioner of Patents and Trademarks